W. HAILES.
Stove Grate.

No. 89,863.

Patented May 11, 1869.

Witnesses

Inventor

United States Patent Office.

WILLIAM HAILES, OF ALBANY, NEW YORK.

Letters Patent No. 89,863, dated May 11, 1869.

---

STOVE-GRATE.

---

The Schedule referred to in these Letters Patent and making part of the same.

---

*To all whom it may concern:*

Be it known that I, WILLIAM HAILES, of Albany, in the county of Albany, and State of New York, have invented a new and improved Stove-Grate; and I do hereby declare that the following is a full, clear, and exact description thereof, reference being had to the accompanying drawings, making part of this specification, in which—

Similar letters of reference indicate corresponding parts in the several figures.

This invention relates to an improvement on the construction of circular sectional dumping-grates which are allowed to receive horizontal oscillating or shaking motions, dumping or dilling motions, and which are supported upon anti-friction rollers to allow them to oscillate freely.

The nature of my invention consists in constructing the grate with a circular concentric ring having grooves in its bottom for receiving rollers or anti-friction balls, and divisions for preventing the balls from rolling together, and in constructing a tripod or bipedal bearer for such grate, with a circular concentric ring having an annular groove in its upper surface adapted to receive and form a bearing for said rollers, and support the grate so that it can be freely rotated about its axis, as will be hereinafter explained.

To enable others skilled in the art to understand my invention, I will describe its construction and operation.

In the accompanying drawings, A represents a horizontal ring, constructed with a flange, $a$, on the upper side, and also, with three depressed bearings $b$, depending from its bottom side and inner edge.

This ring forms a support for a tripod or bipedal grate-bearer, and is the ring usually employed at the base of the fire-brick lining of a stove, and constitutes a fixed part of a stove.

Figure 2:
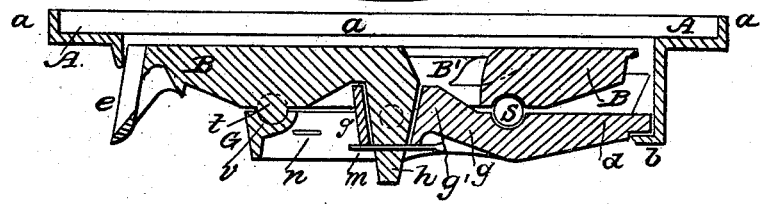
Figure 2 is a diametrical section through the same.

The tripod-bearer consists of three arms, $d\ d\ d$, radiating from the centre of three-quarters of a circular bearing or ring G, in the centre of which ring, and secured to it by three arms $g\ g\ g'$ is a tapered socket, $g'$, for receiving the vertical centre pin or pivot $h$ of the grate, as shown in fig. 2.

The outer ends of the three arms $d\ d\ d$, are rounded and supported in the stirrups or depressed bearings $d$, so that the grate and ring G may be tilted forward for dumping coal or cinders from a fire-pot.

The upper surface of the ring G has an annular groove, $v$, in it, adapted for receiving and affording a bearing for spherical balls or anti-friction rollers $s$.

There are also oblong holes, $n$, made through the ring G, leading down from the base of the groove $v$, for the purpose of preventing the accumulation in said groove of ashes or other obstructions to the free movements of the rollers $s$.

Figure 1:
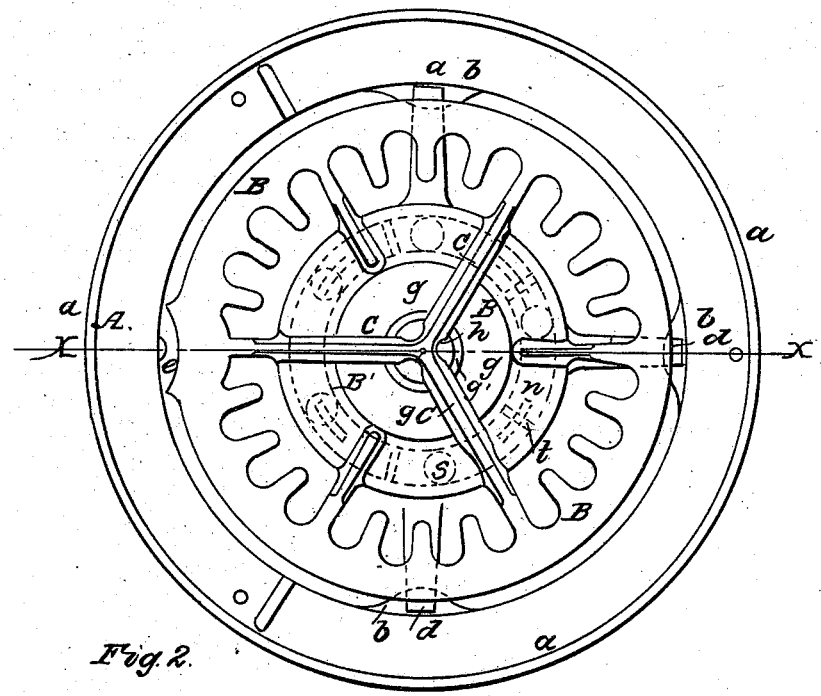
Figure 1 is a top view of the improved grate and its circular bearing.
Figure 3:
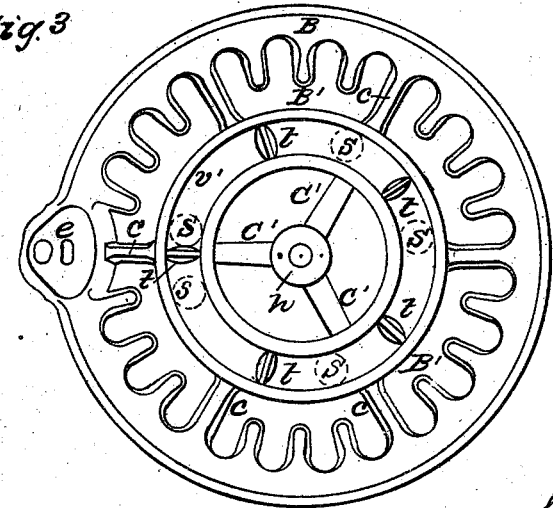
Figure 3 is a bottom view of the grate.

The grate B is circular, and is cast with a concentric depressed ring, B', united by arms $c\ c\ c\ c$ to an outer concentric ring having its inner edge scalloped, as shown in figs. 1 and 3.

In the centre of the grate, and depending from arms $c'\ c'$, is a conical pin, $h$, which is fitted in the socket $g'$ of the tripod, and connected to this tripod by a pin or rivet $m$, shown in fig. 2.

The bottom surface of the depressed ring B' is grooved and provided at regular intervals apart with divisions $t$ having rounded bottom edges, shown in figs. 2 and 3.

The groove $v'$ corresponds in diameter, shape, and size, to the groove $v$ in the upper side of ring G, and is adapted to receive partially in it the balls or rollers $s$.

To apply the anti-friction balls $s$ between the grate and its tripod or bipedal bearer, the grate is inverted as shown in fig. 3, and a ball, $s$, put into each one of the grooved apartments, as indicated by red lines in this figure.

The tripod is then inverted and adjusted in place, so that its groove $v$ will receive all the balls $s$ in groove $v'$, after which the pin or rivet $m$ is passed through the centre pivot $h$, and the grate turned over and adjusted in place within the ring A.

It will be seen, by reference to fig. 2, that the grate does not touch the tripod-bearer, but rests wholly upon the balls $s$, which are free to roll with the grate, and are held in place between the two rings B G, so that they cannot fall out or become clogged.

These balls will thus afford anti-friction bearings for the grate, and allow it to be rotated about its vertical axis without much friction.

The partitions $t\ t$, not only prevent the balls from rolling together, but they also serve as scrapers, owing to their rounded edge working in the groove $v$ for scraping any obstruction which might get into this groove into the vertical openings $n$, made through the ring G.

Having described my invention,

What I claim as new and desire to secure by Letters Patent, is—

1. A tripod or bipedal bearer for a circular grate, consisting of a grooved ring, G, perforated at $n$, a central socket $g'$, and arms $g\ d$, made of one piece, substantially as described and for the purposes set forth.

2. The concentric ring B', formed on the plate B, with the ring of a bearer, G, and with friction rollers or balls between them, substantially as described.

3. The manner, substantially as described and shown, of combining a circular grate with a tripod or bipedal bearing, anti-friction rolling bearings $s\ s\ s$, and divisions $t$, substantially as set forth.

WILLIAM HAILES.

Witnesses:
JNO. G. TREADWELL,
S. R. BORTLE.